(12) United States Patent
Fan et al.

(10) Patent No.: US 11,377,096 B2
(45) Date of Patent: Jul. 5, 2022

(54) AUTOMATIC PARKING METHOD AND DEVICE

(71) Applicant: Guangzhou Automobile Group Co., Ltd., Guangdong (CN)

(72) Inventors: Ming Fan, Guangdong (CN); Qiaojun He, Guangdong (CN); Songzhi Xu, Guangdong (CN); Hongshan Zha, Guangdong (CN); Wenli Zhou, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 28 days.

(21) Appl. No.: 16/344,366

(22) PCT Filed: Oct. 16, 2018

(86) PCT No.: PCT/CN2018/111540
§ 371 (c)(1),
(2) Date: Apr. 24, 2019

(87) PCT Pub. No.: WO2019/214163
PCT Pub. Date: Nov. 14, 2019

(65) Prior Publication Data
US 2021/0323537 A1   Oct. 21, 2021

(30) Foreign Application Priority Data

May 11, 2018   (CN) .......................... 201810449881.3

(51) Int. Cl.
*B60W 30/06*   (2006.01)
*B60W 60/00*   (2020.01)
(Continued)

(52) U.S. Cl.
CPC ............ *B60W 30/06* (2013.01); *B60W 30/12* (2013.01); *B60W 30/18154* (2013.01);
(Continued)

(58) Field of Classification Search
CPC .. B60W 30/06; B60W 60/0011; B60W 30/12; B60W 30/18154; B60W 2556/25;
(Continued)

(56) References Cited

U.S. PATENT DOCUMENTS

| 10,328,932 | B2* | 6/2019 | Gieseke | ................ B60W 30/00 |
| 2010/0156672 | A1* | 6/2010 | Yoo | .......................... G08G 1/14 |
| | | | | 340/436 |

(Continued)

FOREIGN PATENT DOCUMENTS

| CN | 103606300 A | 2/2014 |
| CN | 105679068 A | 6/2016 |

(Continued)

*Primary Examiner* — Mohamed Barakat
(74) *Attorney, Agent, or Firm* — ScienBiziP, P.C.

(57) ABSTRACT

Provided are an automatic parking method and device. The automatic parking method includes: acquiring a global waypoint map of a parking lot where a vehicle is to be parked and position information of available parking spaces, and performing global path planning according to the global waypoint map and the available parking space position information; starting automatic driving according to the global path planning, acquiring vehicle visual information, and performing local path planning and obstacle avoidance processing according to the vehicle visual information; and searching for a parking space when automatically driving to the vicinity of the available parking spaces, and performing parking after finding an available parking space that satisfies a parking condition.

10 Claims, 1 Drawing Sheet

(51) Int. Cl.
*B60W 30/12* (2020.01)
*B60W 30/18* (2012.01)
*G08G 1/14* (2006.01)

(52) U.S. Cl.
CPC ......... *B60W 60/0011* (2020.02); *G08G 1/141* (2013.01); *G08G 1/145* (2013.01); *B60W 2556/25* (2020.02); *B60W 2556/40* (2020.02); *B60W 2556/60* (2020.02)

(58) Field of Classification Search
CPC .......... B60W 2556/40; B60W 2556/60; G08G 1/141; G08G 1/145
See application file for complete search history.

(56) References Cited

U.S. PATENT DOCUMENTS

| | | | |
|---|---|---|---|
| 2012/0188100 A1 | 7/2012 | Min et al. | |
| 2017/0253237 A1* | 9/2017 | Diessner | B60W 50/14 |
| 2017/0267233 A1* | 9/2017 | Minster | B62D 15/02 |
| 2019/0232958 A1* | 8/2019 | Deng | B60T 7/22 |
| 2019/0283738 A1* | 9/2019 | Hüger | B62D 15/0285 |
| 2019/0310624 A1* | 10/2019 | Bettger | G05D 1/0016 |

FOREIGN PATENT DOCUMENTS

| | | |
|---|---|---|
| CN | 106097760 A | 11/2016 |
| CN | 106414201 A | 2/2017 |
| CN | 106875735 A | 6/2017 |
| CN | 107074233 A | 8/2017 |

\* cited by examiner

_US 11,377,096 B2_

AUTOMATIC PARKING METHOD AND DEVICE

The present disclosure claims benefit of Chinese Patent Application No. 201810449881.3, filed to the China Patent Office on May 11, 2018, entitled "Automatic Parking Method and Device", the contents of which are hereby incorporated by reference in its entirety.

TECHNICAL FIELD

The present disclosure relates to the technical field of intelligent driving, and in particular, to an automatic parking method and device.

BACKGROUND

Automatic parking refers to automatic parking of vehicles without manual operations. An automatic parking system is an important part of a low speed pilotless system. At present, most of the methods used for automatic parking include: positioning based on a parking lot monitoring system or using a special conveyor belt to transfer a demanded vehicle to a parking area, for automatic access. For example, the patent No. CN201680007096 discloses a method for optimizing the use of a parking surface. By utilizing the remaining mileage of each vehicle, a transposition parking function can be achieved, and finally the effect of increasing the number of vehicles that can be parked can be achieved. The patent No. CN201680007235 discloses a method for realizing automatic parking in a prescribed parking space, which realizes dynamic vehicle positioning with at least one fixed parking lot monitoring system, and uses a parking lot server to provide a dynamic trajectory to assist a vehicle to be close to an available parking space. The patent No. CN106585626A discloses a trajectory tracking type parking method, which uses a parking lot main control device to provide an accurate parking lot map and an accurate parking space position, and obtains an accurate vehicle self-positioning device for vehicle motion guidance. The method does not use visual or ultrasonic waves for road access area identification, does not make parking position auto-identification of vehicle, and relies entirely on accurate maps and high-precision positioning information.

The existing automatic parking system realizes positioning by means of a fixed monitoring system in a specific parking area, and requires a parking lot server to perform dynamic path planning for a vehicle to be parked, which increases the computing cost of server. If there is no such monitoring system, automatic parking cannot be realized. This condition limits the scenario where automatic parking can be realized and increases the cost of parking lot renovation.

SUMMARY

The technical problem to be solved by the present disclosure is to provide an automatic parking method and device, which use a T-box as an automatic parking information interaction entity that only needs to perform an information interaction with a parking lot transmission device when a vehicle enters a parking lot to obtain a rough waypoint map, and then obtain vehicle visual information using vehicle vision for automatically parking.

In order to solve the above technical problem, according to an embodiment of the present disclosure, an automatic parking method is provided, which includes the steps as follows.

In step S1, a global waypoint map of a parking lot were; a vehicle is to be parked and position information of available parking spaces are acquired, and global path planning is performed according to the global waypoint map and the available parking space position information.

In step S2, automatic driving is started according to the global path planning, vehicle visual information is acquired, and local path planning and obstacle avoidance processing are performed according to the vehicle visual information.

In step S3, a parking space is searched when it automatically drives to the vicinity of the available parking spaces, and parking is performed after finding a target parking space that satisfies a parking condition.

The step of acquiring vehicle visual information in step S2 specifically includes: the Lane lines, lane width, pedestrian, obstacle information and intersection information in front of the vehicle are acquired.

Step S1 further includes: the type and number of intersections in the parking lot are extracted from the global waypoint map, and then a crossing behavior of each intersection is extracted according to the global path planning sequence.

Step S2 further includes: after identifying the intersection information in front of the vehicle, a crossing behavior of a current intersection is extracted, then it crosses the current intersection according to the extracted crossing behavior.

Step S3 specifically includes: a parking space is searched by using look-around information and ultrasonic information, and after finding a target parking space that satisfies the parking condition, automatic parking path tracking and automatic parking are performed by using the look-around information and the ultrasonic information; when the available parking space does not satisfy the parking condition, global path planning is performed again according to the acquired global waypoint map and position information of other available parking spaces, and then step S2 and step S3 are performed.

The parking condition is that the length of an available parking space is not less than a distance obtained by adding 0.8 meter to the length of the vehicle, and the width of the available parking space is not less than a distance obtained by adding 0.8 meter to the width of the vehicle.

The global waypoint map of the parking lot and the position information of available parking spaces are specifically expressed as: equidistantly drawing road center lines inside the parking lot to obtain waypoints of the parking lot, and expressing each waypoint as (x, y, state), where x and, y respectively indicate a horizontal axis value and a vertical axis value of the waypoint, 'state' indicates the state of an available parking space, if there is an available parking space within the distance set on both road sides of the waypoint, 'state' is marked as 1, otherwise 'state' is marked as 0.

The intersection type includes a crossroad, a T-shaped intersection and an L-shaped intersection, and the crossing behavior includes: left turn, right turn and straight driving.

After step S3, the method further includes: after completing the parking, a vehicle parking state and vehicle position information are sent to a user.

The automatic parking method further includes step S4: after receiving a scheduled pick-up signal, a parking program is first executed to drive the vehicle to the middle of a lane, then lane keeping is performed by using a lane line, when identifying the front intersection information, the extracted crossing behavior of the current intersection is retrieved, the extracted intersection crossing behavior is reversed, then the intersection is crossed, and finally control the vehicle travel to a scheduled pick-up location.

According to an embodiment of the present disclosure, an automatic parking device is also provided, which includes a T-box information interaction sub-device, an on-board visual sensor and an APA controller.

The T-box information interaction sub-device is configured to perform information interaction with a parking lot transmission device when a vehicle enters an entrance of a parking lot where the vehicle is to be parked, and acquire a global waypoint map of the parking lot and position information of available parking spaces.

The on-board visual sensor is configured to acquire vehicle visual information.

The APA controller is configured to perform global path planning according to the global waypoint map and the position information of available parking spaces, and perform local path planning and obstacle avoidance processing according to the vehicle visual information, and is further configured to perform parking according to an available parking space that is found by the on-board visual sensor and satisfies a parking condition when it automatically drives to the vicinity of the available parking spaces.

The APA controller is further configured to extract the type and number of intersections in the parking lot from the global waypoint map, then extract a crossing behavior of each intersection according to the global path planning sequence, extract, after identifying front intersection information, a crossing behavior of a current intersection, and cross the current intersection according to the extracted crossing behavior.

The advantageous effects of the embodiment of the present disclosure are that the present disclosure utilizes an in-vehicle T-box as an automatic parking information interaction entity; the T-box only needs to perform an information interaction with a parking lot transmission device when a vehicle enters an entrance of a parking lot to obtain a waypoint map and position information of available parking spaces, and a vehicle visual sensor and waypoint information are used to realize autonomous parking inside the parking lot. The present disclosure does not rely on a high-precision map, parking lot fixed monitoring and GPS positioning information, so that the renovation cost of a parking lot can be greatly reduced, and customer time wasted in the process of parking at the destination is greatly saved.

BRIEF DESCRIPTION OF THE DRAWINGS

In order to more clearly illustrate the embodiments of the present disclosure or the technical solutions in the conventional art, the drawings used in the description of the embodiments or the conventional art will be briefly described below. It is apparent that the drawings in the following description are only some embodiments of the present disclosure, and other drawings can be obtained from those skilled in the art according to these drawings without any creative work.

DETAILED DESCRIPTION OF THE EMBODIMENTS

The following description of various embodiments is provided to illustrate implementable specific embodiments of the present disclosure with reference to the drawings.

Figure 1:
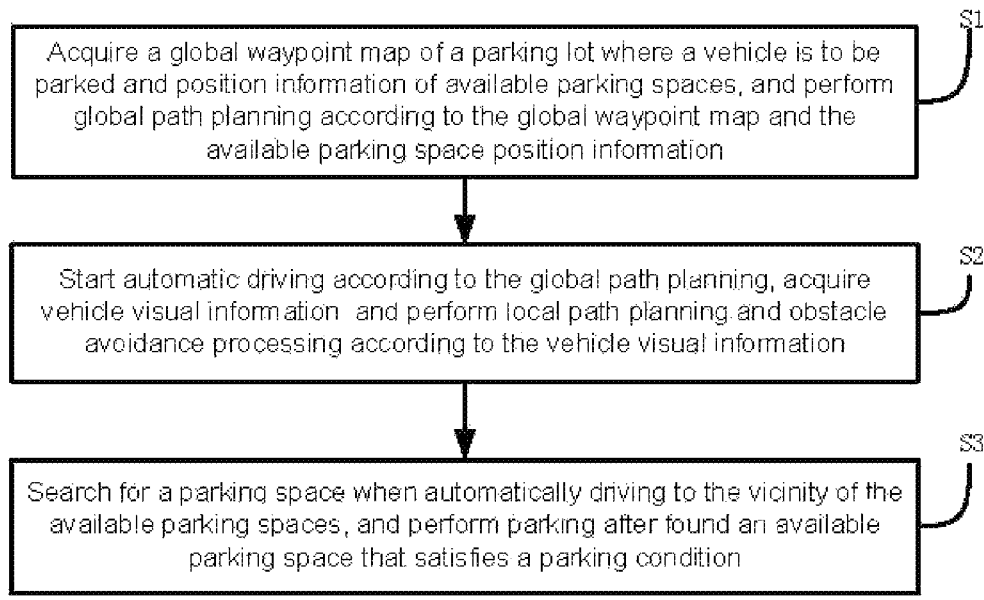
FIG. 1 is a flowchart of an automatic parking method according to an embodiment of the present disclosure.

Referring to FIG. 1, a first embodiment of the present disclosure provides an automatic parking method, which includes the steps as follows.

In step S1, a global waypoint map of a parking lot and position information of available parking spaces are acquired, and global path planning is performed according to the global waypoint map and the available parking space position information.

Step S1 further includes that the type and number of intersections in the parking lot are extracted from the global waypoint map, and then a crossing behavior of each intersection is extracted according to the global path planning sequence, wherein the intersection type includes a crossroad, a T-shaped intersection and an L-shaped intersection, and the crossing behavior includes: left turn, right turn and straight driving.

Specifically, when the vehicle enters the entrance of the parking lot, the T-box performs information interaction with a parking lot transmission device to acquire global waypoint map of the parking lot and position information of available parking spaces, and an in-vehicle APA controller first extracts the number of intersections, T-shaped intersections and L-shaped intersections in the parking lot according to the waypoint map, then performs global path planning according to an A* algorithm (also known as an A-Star algorithm, which is the most efficient direct search method for solving the shortest path in a static road network), then traces an algorithm line and extracts a crossing behavior of the intersection.

The entrance of the parking lot is also an area for automatic parking and get-off, booking and parking. The parking lot transmission device includes a camera, a Bluetooth communication module, RFID, etc. The parking lot transmission device may communicate with an in-vehicle T-box by means of mobile communication or V2X communication. When using V2X communication, the distance between the vehicle and the entrance should be less than or equal to 10 m, the parking lot transmission device and T-box communicate to complete the docking of the paid account. After the docking is completed, the entire parking lot waypoint map is transmitted to the T-box, which describes the road conditions of the parking lot and the conditions of available parking spaces.

The global waypoint map and the position information of available parking spaces may be expressed as: equidistantly drawing road center lines inside the parking lot to obtain all waypoints of the parking lot, and expressing each waypoint as (x, y, state), where x and y respectively indicate a horizontal axis value and a vertical axis value of the waypoint, state indicates the state of an available parking space, if there is an available parking space within the distance set on both road sides of the waypoint, state is marked as 1, otherwise state is marked as 0. Based on this, the map shape of the parking lot and the state of available parking spaces can be unified into a series of coordinate point data. This marking mode greatly reduces the transmission size of the waypoint map.

Specifically, equidistant drawing is generally performed at a distance of no more than 3 m, and preferably, equidistant drawing may be performed every 1 m. Specifically, the distance set on both road sides generally refers to the distance within 5 m.

In step S2, automatic driving is started according to the global path planning, vehicle visual information is acquired, and local path planning and obstacle avoidance processing are performed according to the vehicle visual information.

The lane lines, lane width, pedestrians and obstacles in front of the vehicle are identified by using a front view sensor, and intersection information in front of the vehicle is identified by using a look-around sensor. During the running of the vehicle, the APA controller performs local path planning and obstacle avoidance processing. When a look-around sensor identifies the front intersection information, the APA controller sequentially retrieves the crossing behavior of the current intersection extracted in step S1, and the current intersection is crossed according to the extracted crossing behavior.

The front view sensor may be a front view camera, and the look-around sensor may be a look-around camera. Specifically, the lane width detected by the front view camera is not less than 3.5 m, preferably between 3.5 m and 8 m, and the detectable farthest distance is not less than 10 m. The detection of pedestrians in front requires a distance range from the vehicle sensor to be not less than meters, preferably within 1 to 10 m, and the positioning error of an in-vehicle GPS is controlled within 2 m.

In step S3, a target parking space is searched when a vehicle drives to the vicinity of the available parking spaces, and parking is performed after finding the target parking space.

When the vehicle drives to the vicinity of available parking spaces, a target parking space is searched by using the look-around camera and the ultrasonic wave. When an available parking space is found, the size of the available parking space is judged. If the size of the available parking space satisfies the condition, the available parking space is the target parking space. Then, automatic parking path tracking and behavior decision making are performed by using the look-around camera and the ultrasonic wave, and longitudinal acceleration and deceleration control of the vehicle is performed by using an ESP.

Specifically, driving of the vehicle to the vicinity of the available parking space specifically refers to driving to a position where the distance from the vehicle to the available parking space is less than 3 m.

The available parking space may be a parallel parking space or a vertical parking space. Judging whether the parking condition is satisfied or not is judging whether the available parking space satisfies: the length of an available parking space is not less than a distance obtained by adding 0.8 m to the length of the vehicle (for example, the front and back markings of the available parking space are 0.8 m from the front and back of the vehicle respectively), and the width thereof is not less than a distance obtained by adding 0.8 m to the width of the vehicle (for example, the left and right markings of the available parking space are 0.4 m from the left and right of the vehicle respectively). The available parking space that satisfies the above parking condition is used as the target parking space for automatic parking of the vehicle.

After step S3, in order to facilitate a user to understand the state and position signals of the vehicle, the method further includes that after completing the parking, a vehicle parking state and vehicle position information are sent to the user by the T-box.

The automatic parking method of the present disclosure may further include step S4 in addition to the foregoing three steps. When receiving a scheduled pick-up signal, the vehicle returns according to an original driving route and drives to a scheduled pick-up location.

Specifically, when the T-box receives reservation information of the user, the vehicle automatically starts, first executes a parking program to drive to the middle of a lane, and then uses a lane line obtained by the visual sensor to perform lane keeping. During the running of the vehicle, the front view camera continues to identify the front lane line, vehicles, pedestrians and obstacles, and the look-around camera identifies the front intersection information. When the look-around camera recognizes the intersection information, information stored in Flash is called, planned intersection steering information of step S1 is called reversely and reversed, and finally the vehicle drives to the scheduled location.

Figure 2:
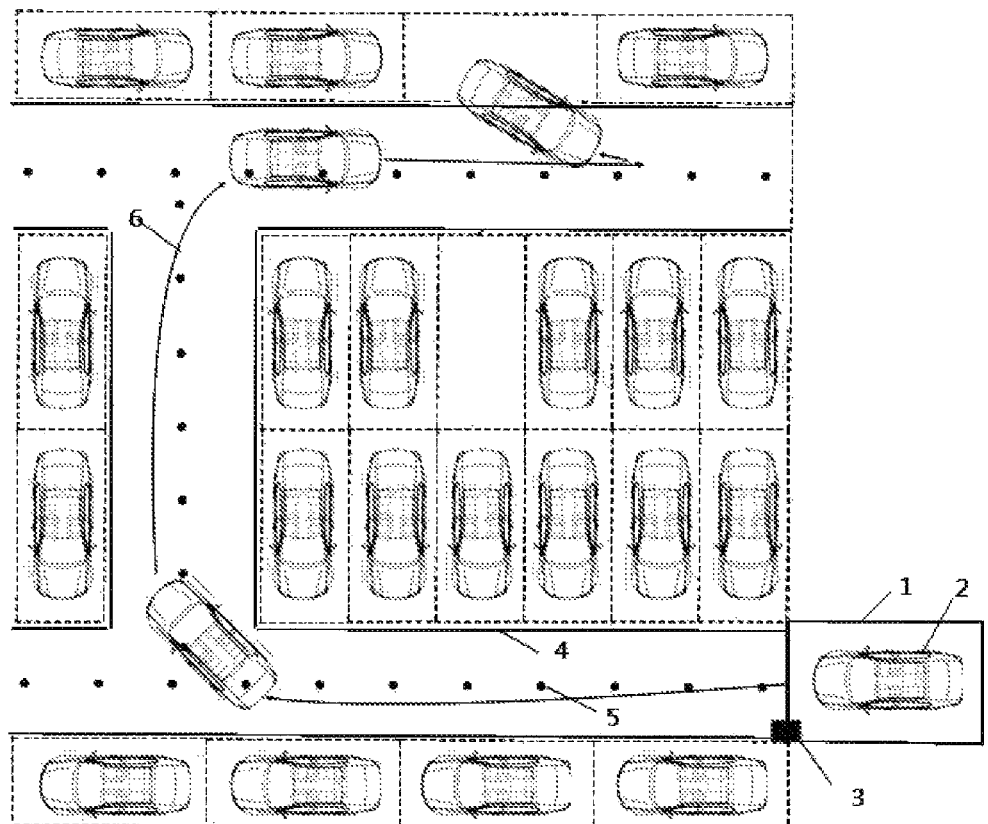
FIG. 2 is a specific flowchart of an automatic parking method according to an embodiment of the present disclosure.

Please refer to FIG. 2, specific description is made below with reference to FIG. 2.

A vehicle 2 enters an area 1 for automatic parking and get-off, booking and parking, a parking lot transmission device 3 communicates with a T-box to complete the docking of a paid account. After the docking is completed, the parking lot transmission device transmits the entire parking lot waypoint map and position information of available parking spaces to the T-box. The information of each waypoint 5 is transmitted in the form of (x, y, state). After the T-box obtains the waypoint map of the parking lot and the position information of available parking spaces, the parking lot opens an entrance railing, a customer gets off the vehicle, the vehicle is in an unmanned state and is automatically locked, an in-vehicle APA controller extracts the number of intersections in the parking lot according to the waypoint map, and in the parking lot, the number of extracted L-shaped intersections is 2. Then, global path planning is performed according to an A* algorithm to obtain a global planning path 6. According to the global path planning, an algorithm route is traced, and it may be determined that a crossing behavior of a first L-shaped intersection is right turn and a crossing behavior of a second L-shaped intersection is right turn. Then, the vehicle automatically enters the parking lot at a low speed. The front view camera identifies a lane line 4, pedestrian and obstacle information in front of the vehicle, and the look-around camera identifies the front intersection. When the look-around camera recognizes the first L-shaped intersection, the APA controller sequentially retrieves the right turn information of the first L-shaped intersection during global path planning, the vehicle turns right at the first L-shaped intersection, and the vehicle continues to drive. When the look-around camera finds the second L-shaped intersection, according to the same method for an L-shaped intersection, the steering information of the second L-shaped intersection during global path planning is retrieved according to the same method as that for the first L-shaped intersection, and then the vehicle turns right. When the vehicle is driving to the vicinity of a parking space, a parallel parking space and a vertical parking space can be found by using the look-around camera and ultrasonic information. Then, it is judged whether the size of the parking space satisfies the parking condition. When both the parallel parking space and the vertical parking space satisfy the condition, any one parking space can be selected for parking. When neither the parallel parking space nor the vertical parking space satisfies the condition, global path planning is performed again according to the acquired global waypoint map and position information of other available parking spaces, and then the vehicle automatically drives to a next available parking space obtained by global path planning in the same manner. For example, in the figure, the parallel parking space is selected for parking of the vehicle, and after the parking space is found, automatic parking path tracking and behavior decision making are performed by using the ultrasonic wave and the look-around camera, and longitudinal acceleration and deceleration control of the vehicle is performed by using an ESP. After the parking is completed, the vehicle is turned off, and the vehicle parking state and GPS position information are sent to the user through the T-box. At this time, the T-box continues to operate at low power, except for in-vehicle devices other than the T-box, waiting for the customer to summon. When the user needs to use the vehicle, the T-box receives a scheduled pick-up signal, the vehicle automatically starts, and the automatic parking system starts, automatically reads the previous driving path information stored in the flash, and combines the above path information to perform returning route planning. The vehicle leaves the parking space, drives to the middle of the lane, and returns according to the original route. During this process, the front-view camera continues to identify the front lane line, pedestrians and obstacles, and the look-around camera continues to identify the intersection information. When the look-around camera recognizes the second intersection information, the vehicle reversely calls the previous path planning information and reverses it. For example, in the second L-shaped intersection, the vehicle turns left since the vehicle turned right previously. The vehicle drives to the pick-up location specified by the customer, the customer activates a mobile phone and clicks to unlock the door, and the automatic parking work ends.

The automatic parking method of the present disclosure utilizes a T-box as an automatic parking information interaction entity; an information interaction only needs to be performed when a vehicle enters a parking lot to obtain rough waypoint map information, and on-board visual information and waypoint map are used to perform vehicle driving and autonomous parking inside the parking lot without relying on a high-precision map, parking lot fixed monitoring and GPS information, so that the renovation cost of the parking lot is reduced, and customer time wasted in the process of parking at the destination is saved.

Based on the first embodiment of the present disclosure, a second embodiment of the present disclosure provides an automatic parking device, which includes: a T-box information interaction sub-device, an on-board visual sensor and an APA controller.

The T-box information interaction sub-device is configured to perform information interaction with a parking lot transmission device when a vehicle enters an entrance of a parking lot, and acquire a global waypoint map of the parking lot and position information of available parking spaces.

The on-board visual sensor is configured to acquire vehicle visual information.

The APA controller is configured to perform global path planning according to the global waypoint map and the position information of available parking spaces, and perform local path planning and obstacle avoidance processing according to the vehicle visual information, and is further configured to perform parking according to an available parking space that is found by the on-board visual sensor and satisfies a parking condition when automatically driving to the vicinity of the available parking spaces.

The APA controller is further configured to extract the type and number of intersections in the parking lot from the global waypoint map, then extract a crossing behavior of each intersection according to the global path planning sequence, extract, after identifying front intersection information, a crossing behavior of a current intersection, and cross the current intersection according to the extracted crossing behavior.

The working principle and the beneficial effects of the present embodiment refer to the description of the first embodiment of the present disclosure, and details are not described herein again.

The above is a further detailed description of the present, disclosure in connection with the specific preferred embodiments, and the specific embodiments of the present disclosure are not limited to the description. A number of simple derivations or replacements may be made by those of ordinary skill in the art without departing from the conception of the present disclosure, and all fall within the scope of protection of the present disclosure.

What is claimed is:

1. An automatic parking method, comprising:
    step S1, acquiring a global waypoint map of a parking lot where a vehicle is to be parked and position information of available parking spaces, performing global path planning according to the global waypoint map and the available parking space position information, and extracting the type and number of intersections in the parking lot from the global waypoint map, and then extracting a crossing behavior of each intersection according to the global path planning sequence;
    step S2, starting automatic driving according to the global path planning, acquiring vehicle visual information, performing local path planning and obstacle avoidance processing according to the vehicle visual information, and extracting a crossing behavior of a current intersection after identifying the intersection information in front of the vehicle, wherein the vehicle crosses the current intersection according to the extracted crossing behavior; and
    step S3, searching for a parking space when it automatically drives to the vicinity of the available parking spaces, and performing parking after finding an available parking space that satisfies a parking condition.

2. The automatic parking method as claimed in claim 1, wherein acquiring vehicle visual information in step S2 specifically comprises:
    acquiring lane lines, lane width, pedestrian, obstacle information and intersection information in front of the vehicle.

3. The automatic parking method as claimed in claim 1, wherein step S3 specifically comprises:
    searching for a parking space by using look-around information and ultrasonic information, and after finding a target parking space that satisfies the parking condition, performing automatic parking path tracking and automatic parking by using the look-around information and the ultrasonic information.

4. The automatic parking method as claimed in claim 1, wherein when the available parking space does not satisfy the parking condition, global path planning is performed again according to the acquired global waypoint map and position information of other available parking spaces, and then step S2 and step S3 are performed.

5. The automatic parking method as claimed in claim 1, wherein the parking condition is:
    the length of an available parking space is not less than a distance obtained by adding 0.8 meter to the length of the vehicle, and the width of the available parking space is not less than a distance obtained by adding 0.8 meter to the width of the vehicle.

6. The automatic parking method as claimed in claim 1, wherein the global waypoint map of the parking lot and the position information of available parking spaces are specifically expressed as:

equidistantly drawing road center lines inside the parking lot to obtain waypoints of the parking lot, and expressing each waypoint as (x, y, state), where x and y respectively indicate a horizontal axis value and a vertical axis value of the waypoint, 'state' indicates the state of an available parking space, if there is an available parking space within the distance set on both road sides of the waypoint, 'state' is marked as 1, otherwise 'state' is marked as 0.

7. The automatic parking method as claimed in claim 1, wherein the intersection type comprises a crossroad, a T-shaped intersection and an L-shaped intersection, and the crossing behavior comprises: left turn, right turn and straight driving.

8. The automatic parking method as claimed in claim 1, wherein after step S3, the method further comprises:
after completing the parking, sending a vehicle parking state and vehicle position information to a user.

9. The automatic parking method as claimed in claim 1, further comprising:
step S4, after receiving a scheduled pick-up signal, first executing a parking program to drive the vehicle to the middle of a lane, then performing lane keeping by using a lane line, when identifying the front intersection information, retrieving the extracted crossing behavior of the current intersection, reversing the extracted intersection crossing behavior, then crossing the intersection, and finally driving to a scheduled pick-up location.

10. An automatic parking device, comprising a T-box information interaction sub-device, an on-board visual sensor and an APA controller, wherein
the T-box information interaction sub-device performs information interaction with a parking lot transmission device when a vehicle enters an entrance of a parking lot where the vehicle is to be parked, and acquires a global waypoint map of the parking lot and position information of available parking spaces;
the on-board visual sensor acquires vehicle visual information; and
the APA controller performs global path planning according to the global waypoint map and the position information of available parking spaces, performs local path planning and obstacle avoidance processing according to the vehicle visual information, and performs parking according to an available parking space that is found by the on-board visual sensor and satisfies a parking condition when automatically driving to the vicinity of the available parking spaces; and
the APA controller extracts the type and number of intersections in the parking lot from the global waypoint map, then extract a crossing behavior of each intersection according to the global path planning sequence, extract, after identifying front intersection information, a crossing behavior of a current intersection, and cross the current intersection according to the extracted crossing behavior.

\* \* \* \* \*